(12) United States Patent
Hamasaki et al.

(10) Patent No.: US 7,531,942 B2
(45) Date of Patent: May 12, 2009

(54) ULTRASONIC ROTARY DRIVE DEVICE

(75) Inventors: Takuji Hamasaki, Saitama (JP); Takahiro Kobayashi, Saitama (JP)

(73) Assignee: Hoya Corporation, Tokyo (JP)

( * ) Notice: Subject to any disclaimer, the term of this patent is extended or adjusted under 35 U.S.C. 154(b) by 49 days.

(21) Appl. No.: 11/857,497

(22) Filed: Sep. 19, 2007

(65) Prior Publication Data

US 2008/0067894 A1      Mar. 20, 2008

(51) Int. Cl.
     *H02N 2/00* (2006.01)
(52) U.S. Cl. .............................. 310/323.08; 310/323.01
(58) Field of Classification Search ............ 310/323.01, 310/323.02, 323.03, 323.08, 323.14
     See application file for complete search history.

(56) References Cited

U.S. PATENT DOCUMENTS 5,053,670 A * 10/1991 Kosugi ........................ 310/328
2007/0019938 A1    1/2007 Nomura
2007/0057596 A1    3/2007 Kurosawa
2007/0145859 A1    6/2007 Kurosawa
2007/0273982 A1   11/2007 Ishizuka et al.

FOREIGN PATENT DOCUMENTS

JP             2503997 B2    4/1996

* cited by examiner

*Primary Examiner*—Thomas M Dougherty
(74) *Attorney, Agent, or Firm*—Greenblum & Bernstein, P.L.C.

(57) ABSTRACT

An ultrasonic rotary drive device includes an ultrasonic motor including an ultrasonic generating portion and a first rotary output portion, wherein the first rotary output portion is in contact with the ultrasonic generating portion to be rotatable relative to the ultrasonic generating portion and rotates by ultrasonic vibrations generated by the ultrasonic generating portion; and a one-way rotational transfer mechanism including a rotary input portion and a second rotary output portion. The rotary input portion rotates with the first rotary output portion. The second rotary output portion is rotatable independently of the rotary input portion. Rotation of the rotary input portion is transferred to the second rotary output portion when the rotary input portion is rotated. Rotation of the second rotary output portion is prevented from being transferred to the rotary input portion when the second rotary output portion is rotated.

9 Claims, 4 Drawing Sheets

FORWARD ←——→ REARWARD

ULTRASONIC ROTARY DRIVE DEVICE

BACKGROUND OF THE INVENTION

1. Field of the Invention

The present invention relates to an ultrasonic rotary drive device which is configured for reducing the wearing of surfaces of an ultrasonic generating portion and a rotary output portion of an ultrasonic motor which are in sliding contact with each other.

2. Description of the Related Art

In normal motors which include a power generating portion and a rotary output shaft that rotates by power generated by the power generating portion, a large adverse influence is exerted on the power generating portion if an unduly large force is transferred to the power generating portion from the rotary output shaft by rotating the rotary output shaft when the power generating portion is not in action.

In contrast, in ultrasonic motors (e.g., Japanese Patent Publication No. 2503997) which include an ultrasonic generating portion and a rotary output portion that is in contact with the ultrasonic generating portion to be rotatable relative to the ultrasonic generating portion, a large adverse influence is not exerted on the power generating portion (ultrasonic generating portion) as compared with the case of normal motors, even if the rotary output portion is rotated when the ultrasonic generating portion is not in action.

However, since an ultrasonic motor is constructed so that the ultrasonic generating portion and the rotary output portion rotate relative to each other while being in sliding contact with each other, points of contact between the ultrasonic generating portion and the rotary output portion wear away if the rotary output portion is rotated when the ultrasonic generating portion is not in action. Therefore, it is also desirable that an ultrasonic motor be constructed so that the rotary output portion does not rotate when the ultrasonic generating portion is not in action.

SUMMARY OF THE INVENTION

The present invention provides an ultrasonic rotary drive device in which the rotary output portion is prevented from rotating when the ultrasonic generating portion is not in action.

According to an aspect of the present invention, an ultrasonic rotary drive device is provided, including an ultrasonic motor including an ultrasonic generating portion and a first rotary output portion, wherein the first rotary output portion is in contact with the ultrasonic generating portion to be rotatable relative to the ultrasonic generating portion and rotates by ultrasonic vibrations generated by the ultrasonic generating portion; and a one-way rotational transfer mechanism including a rotary input portion and a second rotary output portion. The rotary input portion rotates with the first rotary output portion. The second rotary output portion is rotatable independently of the rotary input portion. Rotation of the rotary input portion is transferred to the second rotary output portion when the rotary input portion is rotated. Rotation of the second rotary output portion is prevented from being transferred to the rotary input portion when the second rotary output portion is rotated.

It is desirable for the one-way rotational transfer mechanism to further include an axially orthogonal surface, provided on the rotary input portion, lying on a plane orthogonal to an axis of the first rotary output portion; a hollow-cylindrical rotary output shaft, serving as the second rotary output portion, provided around the rotary input portion to be freely rotatable relative to the rotary input portion, the hollow-cylindrical rotary output shaft having a cylindrical inner peripheral surface centered on the axis of the first rotary output portion; a circumferentially-uneven-width-space forming portion formed on the rotary input portion to form an annular space including at least one accommodation space between the rotary input portion and the cylindrical inner peripheral surface of the hollow-cylindrical rotary output shaft, the accommodation space having different radial widths at different circumferential positions; at least one differential rotating member pressed against the axially orthogonal surface by a biasing device, the differential rotating member revolving around an axis of the rotary input portion in a same direction as a rotational direction of the rotary input portion while revolving at a slower speed than a speed of the rotation of the rotary input portion in association with the rotation of the rotary input portion; a retainer installed in the annular space, wherein the retainer rotates around the axis of the rotary input portion in a same direction as the revolving direction of the differential rotating member when pressed by the differential rotating member; and at least one torque transfer member rotatably supported by the retainer so as to revolve together with the rotation of the retainer in the accommodation space. The circumferentially-uneven-width-space forming portion is shaped so that the torque transfer member which revolves in a circumferential direction about the axis of the rotary input portion wedges between an outer peripheral surface of the rotary input portion and the cylindrical inner peripheral surface of the hollow-cylindrical rotary output shaft to transfer a torque from the rotary input portion to the hollow-cylindrical rotary output shaft when the rotary input portion is rotated.

It is desirable for the ultrasonic rotary drive device to include a holding member which includes a second axially orthogonal surface lying on a plane orthogonal to the axis of the first rotary output portion and facing the axially orthogonal surface so that a biasing force of the biasing device biases the axially orthogonal surface so as to hold the differential rotating member between the axially orthogonal surface and the second axially orthogonal surface.

It is desirable for the accommodation space to include a plurality of accommodation spaces formed between the circumferentially-uneven-width-space forming portion and the cylindrical inner peripheral surface of the hollow-cylindrical rotary output shaft, and for the torque transfer member to be installed in each of the plurality of accommodation spaces.

It is desirable for the circumferentially-uneven-width-space forming portion to include circumferentially-uneven-depth grooves having different radial depths at different circumferential positions.

It is desirable for the ultrasonic generating portion and the first rotary output portion to be coaxially-arranged ring members, respectively.

It is desirable for the rotary input portion to include a rotary input shaft and a cylindrical torque transfer member which is fitted on the rotary input shaft so as to allow the torque transfer member to move in a direction of an axis of the rotary input shaft relative to the rotary input shaft and prevent the torque transfer member from rotating relative to the rotary input shaft.

It is desirable for the biasing device include a compression coil spring.

It is desirable for the holding member to be formed in a stationary cylindrical member having an annular inner flange, the second axially orthogonal surface being formed on the annular inner flange.

According to the present invention, upon the first rotary output portion rotating by ultrasonic vibrations generated by the ultrasonic generating portion, rotation of the first rotary output portion is transferred from the rotary input portion to the second rotary output portion of the one-way rotational transfer mechanism.

On the other hand, even if the second rotary output portion of the one-way rotational transfer mechanism is rotated, this rotation of the second rotary output portion is not transferred to the rotary input portion of the one-way rotational transfer mechanism. Therefore, even if the second rotary output portion of the one-way rotational transfer mechanism is rotated when the ultrasonic generating portion of the ultrasonic motor is not in action, no wear occurs between the first rotary output portion and the ultrasonic generating portion by the rotation of the second rotary output portion of the one-way rotational transfer mechanism.

The present disclosure relates to subject matter contained in Japanese Patent Application No. 2006-254744 (filed on Sep. 20, 2006) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

An embodiment of an ultrasonic rotary drive device MU according to the present invention is incorporated in an interchangeable lens (not shown) for a camera which can switch a photographing state between autofocus (AF) mode and manual focus MF) mode.

The ultrasonic rotary drive device MU is an integral combination of an ultrasonic motor UM and a one-way rotational transfer mechanism DM. Firstly, the one-way rotational transfer mechanism DM will be discussed hereinafter.

Figure 1:
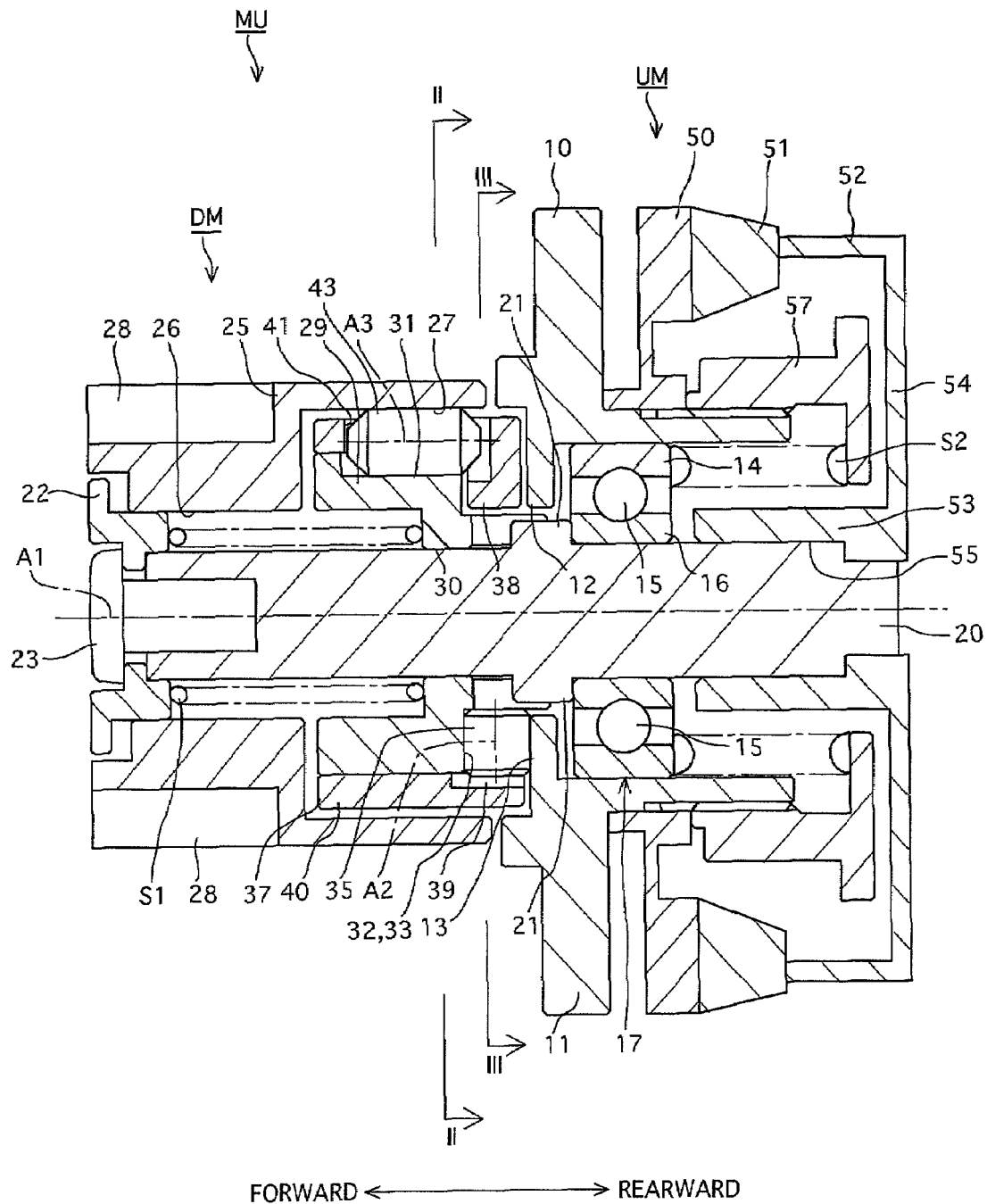
FIG. 1 is a longitudinal cross sectional view of an embodiment of an ultrasonic rotary drive device, according to the present invention.

The one-way rotational transfer mechanism DM is provided with a stationary cylindrical member (holding member) 10, the front and rear ends of which are formed as open ends. The left-hand side and the right-hand side of the ultrasonic rotary drive device MU as viewed in FIG. 1 are defined as the front side and the rear side thereof as shown by the double-headed arrow in FIG. 1, respectively, in the following description. The stationary cylindrical member 10 is provided with an annular outer flange 11 and an annular inner flange 12 which extend radially outwards and inwards, respectively. The outer flange 11 is fixed to an inner surface of a camera body (not shown) by set screws (not shown). A central portion of the front surface of the stationary cylindrical member 10 is formed as a first axially orthogonal surface 13 which lies in a plane orthogonal to the axis of the camera (axis A1). An outer ring 14 is fitted into the stationary cylindrical member 10 to be slidable on an inner peripheral surface thereof (and to be prevented from rotating relative to this inner peripheral surface). An inner ring 16 is positioned radially inside of the outer ring 14 to be concentric with the outer ring 14 with a plurality of bearing balls 15 (only two of which are shown in FIG. 1) being held between the inner ring 16 and the outer ring 14. The inner ring 16 is rotatable relative to the outer ring 14 and prevented from moving in the axial direction relative to the outer ring 14. Accordingly, the outer ring 14, the plurality of bearing balls 15 and the inner ring 16 constitute a ball bearing 17.

The one-way rotational transfer mechanism DM is provided with a rotary input shaft (rotary input portion) 20 which is fitted into the inner ring 16 to be fixed to the inner peripheral surface thereof. The rotary input shaft 20 has a substantially columnar shape and the central axis thereof is coincident with the axis A1. The rotary input shaft 20 is provided, at the center of the outer peripheral surface thereof in the lengthwise direction of the rotary input shaft 20, with a pair of radial projections 21 which are arranged circumferentially at intervals of 180 degrees. A spring retainer 22 is fixed to the front end of the rotary input shaft 20 by a set screw 23. The one-way rotational transfer mechanism DM is provided with a cylindrical (hollow-cylindrical) rotary output shaft (second rotary output portion) 25 arranged concentrically with the rotary input shaft 20. A portion of the inner peripheral surface of the cylindrical rotary output shaft 25 in the vicinity of the front end thereof is fitted on the spring retainer 22 to be rotatable about the axis A1 relative to the rotary input shaft 20 and to be immovable in the axial direction relative to the rotary input shaft 20. The inner peripheral surface of the cylindrical rotary output shaft 25 is provided with a small-diameter cylindrical surface 26 and a large-diameter cylindrical surface 27. The small-diameter cylindrical surface 26 forms substantially a front half of the inner peripheral surface of the cylindrical rotary output shaft 25 and is fitted on the spring retainer 22. The large-diameter cylindrical surface 27 forms substantially a rear half of the inner peripheral surface of the cylindrical rotary output shaft 25, is concentric with the small-diameter cylindrical surface 26, and has a greater diameter than the small-diameter cylindrical surface 26. The cylindrical rotary output shaft 25 is provided at a front end portion of the outer peripheral surface thereof with an output gear 28 which is engaged with an input gear of a focusing mechanism (not shown) installed inside of the interchangeable lens.

The one-way rotational transfer mechanism DM is provided in front of the pair of radial projections 21 with a cylindrical torque transfer member (rotary input portion) 29 arranged concentrically with the rotary input shaft 20. A circular central hole 30 is formed in the torque transfer member 29 therethrough, and the torque transfer member 29 is fitted on the rotary input shaft 20 (i.e., the rotary input shaft 20 is fitted into the circular central hole 30 of the torque transfer member 29) to allow the torque transfer member 29 to move in the direction of the axis A1 relative to the rotary input shaft 20 and to prevent the torque transfer member 29 from rotating relative to the rotary input shaft 20. A compression coil spring (biasing device) S1 is installed in a compressed state over the rotary input shaft 20 between surfaces of the torque transfer member 29 and the spring retainer 22 which face each other so that the torque transfer member 29 is biased rearward by the biasing force of the compression coil spring S1.

Figure 2:
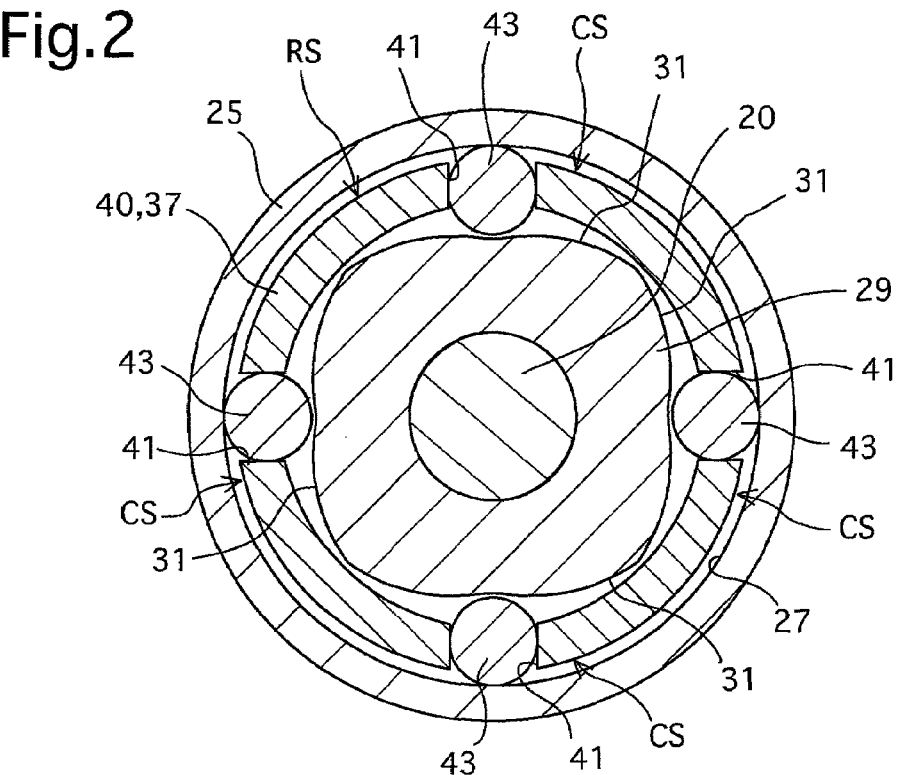
FIG. 2 is a cross sectional view taken along II-II line shown in FIG. 1.

Four circumferentially-uneven-width grooves (circumferentially-uneven-width-space forming portions) 31 are formed in the outer peripheral surface of the torque transfer member 29 at equi-angular intervals of 90 degrees. Each circumferentially-uneven-width groove 31 varies in depth (radial depth) at different circumferential points as shown in FIG. 2, and extends parallel to the axis A1. In addition, an accommodation space (circumferentially-uneven-width space) CS having different radial widths at different circumferential positions is formed between each of the four circumferentially-uneven-width grooves 31 and the large-diameter cylindrical surface 27 of the cylindrical rotary output shaft 25. In other words, as shown in FIG. 2, an annular space RS which is formed between the large-diameter cylindrical surface 27 and the four circumferentially-uneven-width grooves 31, as viewed from the front of the one-way rotational transfer mechanism DM, is divided into four to form the four accommodation spaces CS.

The torque transfer member 29 is provided, on a rear end surface thereof in the vicinity of the outer edge of this rear end surface, with an annular recessed portion 32 which extends circumferentially all around the outer edge of the rear end surface of the torque transfer member 29. The bottom surface of the annular recessed portion 32 is formed as a second axially orthogonal surface 33 which lies in a plane orthogonal to the axis A1 of the rotary input shaft 20, similar to the first axially orthogonal surface 13. Namely, the second axially orthogonal surface 33 is parallel to the first axially orthogonal surface 13.

Four differential rollers (differential rotating members) 35, each having a substantially columnar shape are installed in an annular space about the axis A1 which is positioned between the annular recessed portion 32 (the second axially orthogonal surface 33) and the first axially orthogonal surface 13. Axes A2 of the four differential rollers 35 extend in radial directions of the rotary input shaft 20. Outer peripheral surfaces of the differential rollers 35 are elastically sandwiched between the second axially orthogonal surface 33 and the first axially orthogonal surface 13.

The one-way rotational transfer mechanism DM is provided, in an annular space between the first axially orthogonal surface 13 and the second axially orthogonal surface 33 and another annular space between an outer peripheral surface of the torque transfer member 29 and an inner peripheral surface of the cylindrical rotary output shaft 25, with a cylindrical retainer 37 which is centered on the axis A1 and positioned to extend over these two annular spaces to be allowed to rotate about the rotary input shaft 20 and to move relative to the torque transfer member 29 in the direction of the axis A1 of the rotary input shaft 20.

Figure 3:
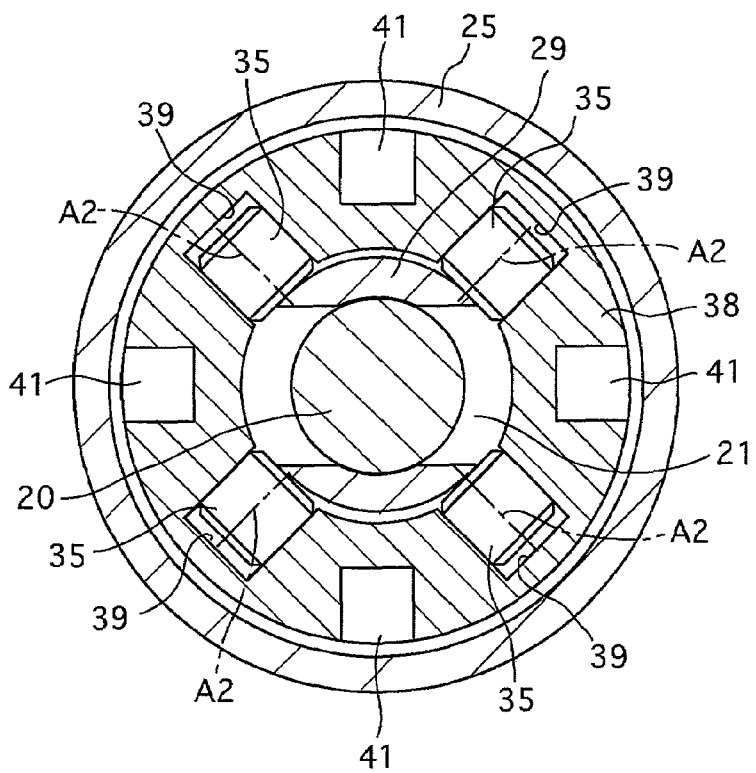
FIG. 3 is a cross sectional view taken along III-III line shown in FIG. 1, in which engageable rollers are omitted for clarity.
Figure 4:
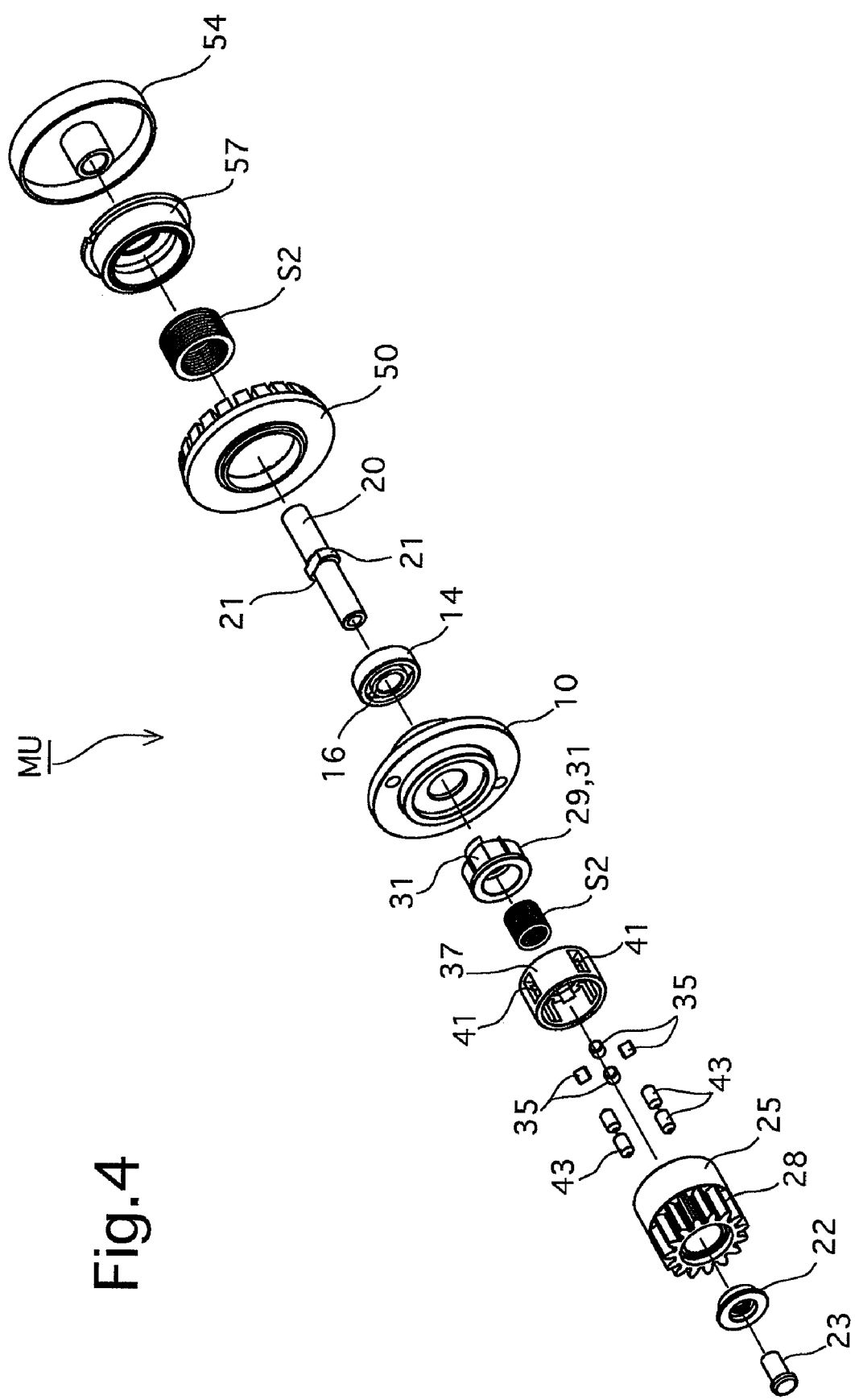
FIG. 4 is an exploded perspective view of the ultrasonic rotary drive device.

The cylindrical retainer 37 is provided at the rear end thereof with an inner flange 38 which is positioned around the rotary input shaft 20 and which projects radially inwards to lie in a plane orthogonal to the axis A1. As shown in FIGS. 1 and 3, four square cut-out portions 39 are formed on the inner edge of the inner flange 38 of the cylindrical retainer 37 to be arranged circumferentially at intervals of 90 degrees, and the four differential rollers 35 are installed in the four square cut-out portions 39, respectively, so that each differential roller 35 can rotate on the axis A2 thereof in the associated square cut-out portion 39. Additionally, four accommodation holes 41 are formed in the cylindrical retainer 37 circumferentially at intervals of 90 degrees to extend over the inner flange 38 and a cylindrical portion 40 of the cylindrical retainer 37. As shown in FIG. 3, the circumferential positions of the four accommodation holes 41 and the circumferential positions of the four square cut-out portions 39 are relatively circumferentially shifted 45 degrees.

Four engageable rollers (torque transfer member) 43 each having a substantially columnar shape are installed in the four accommodation spaces CS, respectively. Axes A3 of the four engageable roller 43 are parallel to the axis A1. Each engageable roller 43 is loosely fitted in the associated accommodation hole 41 to be rotatable therein on the axis A3 of the engageable roller 43.

The structure of the ultrasonic motor UM that is integral with the one-way rotational transfer mechanism DM that has the above described structure will be discussed hereinafter.

The ultrasonic motor UM is provided with an ultrasonic generating member (ultrasonic generating portion) 50 which is formed in a ring member having an axis coincident with axis A1. The ultrasonic generating member 50 is fitted on the stationary cylindrical member 10 to be fixed thereto so that the central hole of the ultrasonic generating member 50 is fixed to an outer peripheral surface of the stationary cylindrical member 10. The ultrasonic generating member 50 is provided, at the rear end thereof on the radially outer side of the ultrasonic generating member 50, with a vibration transmission portion 51 having a ring shape as viewed from the front thereof. The rear end surface of the vibration transmission portion 51 is formed in a plane orthogonal to the axis A1.

Additionally, the ultrasonic motor UM is provided at the rear end of the rotary input shaft 20 with a cylindrical rotary output shaft (first rotary output portion) 54 having a bottomed end. The cylindrical rotary output shaft 54 is provided with an outer cylindrical portion 52 and an inner cylindrical portion 53 which are concentrically arranged. The inner cylindrical portion 53 is fitted on the rear end of the rotary input shaft 20 so that a central hole 55 of the cylindrical rotary output shaft 54 (central hole 55 of the inner cylindrical portion 53) is fixed to the rear end of the rotary input shaft 20. The front end surface of the outer cylindrical portion 52 is formed in a plane orthogonal to the axis A1, and is in contact with the rear end surface of the vibration transmission portion 51 to be slidable thereon to allow the ultrasonic generating member 50 and the outer cylindrical portion 52 to rotate relative to each other. The ultrasonic motor UM is provided, inside an internal space between the ultrasonic generating member 50 and the cylindrical rotary output shaft 54, with a cylindrical retainer 57 which is fitted on an outer peripheral surface of the stationary cylindrical member 10 to be fixed thereto. A compression coil spring S2 is installed between the cylindrical retainer 57 and the outer ring 14. The outer ring 14, the plurality of bearing balls 15 and the inner ring 16 are biased forward by the spring force of the compression coil spring S2 so that the inner ring 16 is in elastic contact with the rear surfaces of the pair of radial projections 21.

The ultrasonic motor UM that has the above described structure is electrically connected to a controller (not shown) composed of electronic components provided in the camera body such as a CPU.

Operations of the ultrasonic rotary drive device MU that has the above described structure will be discussed hereinafter.

Firstly, operations of the ultrasonic rotary drive device MU when an autofocusing operation is carried out will be discussed hereinafter.

Upon an AF switch (not shown) provided on the camera body being operated, the aforementioned controller that is provided in the camera body sends a drive signal to the ultrasonic motor UM for rotating the ultrasonic motor UM.

If this drive signal is a forward-rotation drive signal for rotating the ultrasonic motor UM in the forward direction, the vibration transmission portion 51 generates ultrasonic vibrations traveling in one circumferential direction (counterclockwise direction as viewed in FIG. 2). Thereupon, the cylindrical rotary output shaft 54 (the outer cylindrical portion 52) that is in contact with the rear end surface of the vibration transmission portion 51 rotates in the same direction as the ultrasonic vibrations generated by the vibration transmission portion 51, and accordingly, the rotary input shaft 20 that is integral with the cylindrical rotary output shaft 54 rotates counterclockwise with respect to FIG. 2. This counterclockwise rotation of the rotary input shaft 20 causes the torque transfer member 29, which is non-rotatable relative to the rotary input shaft 20, rotates with the rotary input shaft 20 counterclockwise as viewed in FIG. 2, thus causing each differential roller 35, which is held between the first axially orthogonal surface 13 and the second axially orthogonal surface 33, to rotate about the axis A2 while revolving around the axis A1 in the same rotational direction as the rotary input shaft 20 at a revolving speed half the rotational speed of the rotary input shaft 20. Due to this revolving movement of each differential roller 35, the cylindrical retainer 37 and each engageable roller 43 also revolve counterclockwise at the same revolving speed as each differential roller 35. Thereupon, each engageable roller 43 firmly wedges into one of the radially-narrowed circumferentially opposite end portions of the associated accommodation space CS which is positioned on the clockwise side in the accommodation space CS between the end of the associated circumferentially-unevenwidth groove 31 in the clockwise direction and the largediameter cylindrical surface 27 of the cylindrical rotary output shaft 25. This causes the torque transfer member 29 (the rotary input shaft 20) and the cylindrical rotary output shaft 25 to become circumferentially integral with each other via the differential rollers 35, the cylindrical retainer 37 and the wedged engageable rollers 43 so that the rotation of the torque transfer member 29 (the rotary input shaft 20) is transferred to the cylindrical rotary output shaft 25 to rotate the cylindrical rotary output shaft 25 counterclockwise as viewed in FIG. 2. Thereupon, this rotation of the cylindrical rotary output shaft 25 is transferred from the output gear 28 to the input gear of the aforementioned focusing mechanism (not shown), which is provided in the interchangeable lens, to move a focusing lens group (not shown) forward along the optical axis thereof.

On the other hand, if the aforementioned controller in the camera body outputs a reverse-rotation drive signal to the ultrasonic motor UM to rotate the ultrasonic motor UM in the reverse direction, the vibration transmission portion 51 generates ultrasonic vibrations traveling in the other circumferential direction (clockwise direction with respect to FIG. 2). Thereupon, the cylindrical rotary output shaft 54 that is in contact with the rear end surface of the vibration transmission portion 51 rotates in the same direction as the ultrasonic vibrations generated by the vibration transmission portion 51, and accordingly, the rotary input shaft 20 that is integral with the cylindrical rotary output shaft 54 rotates clockwise as viewed in FIG. 2. This clockwise rotation of the rotary input shaft 20 causes each differential roller 35 to rotate on the axis A2 while revolving around the axis A1 in the clockwise direction as viewed in FIG. 2 at a revolving speed half the rotational speed of the rotary input shaft 20. Due to this clockwise revolving movement of each differential roller 35, the cylindrical retainer 37 and each engageable roller 43 also revolve clockwise as viewed in FIG. 2 at the same revolving speed as each differential roller 35. As a result, each engageable roller 43 firmly wedges into the other of the radiallynarrowed circumferentially opposite end portions of the associated accommodation space CS which is positioned on the counterclockwise side in the accommodation space CS between the end of the associated circumferentially-unevenwidth groove 31 in the counterclockwise direction and the large-diameter cylindrical surface 27 of the cylindrical rotary output shaft 25. This causes the torque transfer member 29 (the rotary input shaft 20) and the cylindrical rotary output shaft 25 to become integral with each other circumferentially via the differential rollers 35, the cylindrical retainer 37 and the wedged engageable rollers 43 so that the rotation of the torque transfer member 29 (the rotary input shaft 20) is transferred to the cylindrical rotary output shaft 25 to rotate the cylindrical rotary output shaft 25 clockwise as viewed in FIG. 2. Thereupon, this rotation of the cylindrical rotary output shaft 25 is transferred from the output gear 28 to the input gear of the aforementioned focusing mechanism (not shown), which is provided in the interchangeable lens, to move the focusing lens group (not shown) rearward along the optical axis thereof.

In this manner, the controller makes the ultrasonic motor UM rotate in forward and reverse directions to move the focusing lens forward and rearward to perform an autofocusing operation.

Immediately after an in-focus state is obtained by the autofocusing operation in this manner, the controller sends a control signal to the ultrasonic motor UM to slightly rotate the ultrasonic motor UM in a rotational direction opposite to the previous rotational direction (rotational direction immediately before focusing is obtained) of the ultrasonic motor UM. Thereupon, the rotary input shaft 20 rotates in a rotational direction opposite to the previous rotational direction (in which the rotary input shaft 20 rotates immediately before the aforementioned in-focus state is obtained) without rotating the cylindrical rotary output shaft 25 to thereby reduce the contacting force of each engageable roller 43 with the associated circumferentially-uneven-width groove 31 and the large-diameter cylindrical surface 27 of the cylindrical rotary output shaft 25. This reduction of such a contacting force allows a manual focus ring (not shown) of the interchangeable lens to be rotated smoothly.

Operations of the ultrasonic rotary drive device MU when a manual focusing operation is carried out will be discussed hereinafter.

In a state shown in FIG. 2, if the manual focus ring of the interchangeable lens is manually rotated with no actuation of the ultrasonic motor UM, this rotation of the manual focus ring is transferred to the focusing mechanism provided in the interchangeable lens to perform a focusing operation (MF operation).

Immediately after the rotation of the manual focus ring is transferred to the focusing mechanism, rotational force is transferred from the focusing mechanism to the output gear 28 of the cylindrical rotary output shaft 25, so that the cylindrical rotary output shaft 25 rotates clockwise or counterclockwise about the rotary input shaft 20, whereas no rotation is transferred from the cylindrical rotary output shaft 25 to each engageable roller 43 since the large-diameter cylindrical surface 27 of the cylindrical rotary output shaft 25 is a cylindrical surface about the axis A1. Therefore, rotation of the cylindrical rotary output shaft 25 does not cause either the cylindrical retainer 37 or each engageable roller 43 to rotate, thus not causing either the torque transfer member 29 or the rotary input shaft 20 to rotate. Consequently, the cylindrical rotary output shaft 54 of the ultrasonic motor UM does not rotate, which prevents surfaces of the outer cylindrical portion 52 and the vibration transmission portion 51 which are in contact with each other from wearing away.

As described above, according to the above illustrated embodiment of the ultrasonic rotary drive device, the ultrasonic rotary drive device MU is achieved in which the cylindrical rotary output shaft 25 rotates when the ultrasonic motor UM rotates and the cylindrical rotary output shaft 54 of the ultrasonic motor UM does not rotate when the cylindrical rotary output shaft 25 is rotated with no actuation of the ultrasonic motor UM.

Moreover, the one-way rotational transfer mechanism DM is not susceptible to use conditions of the camera (e.g., temperature of the camera at a time of exposure), and operates smoothly even if any changes in use conditions occur.

Furthermore, if the structure of the above described embodiment of the ultrasonic rotary drive device is adopted, a photographing state can be switched between AF mode and MF mode without the need for a switch for switching a photographing state between AF mode and MF mode.

A torque can be reliably transferred from the rotary input shaft 20 to the cylindrical rotary output shaft 25 because each differential roller 35 is made to revolve around the rotary input shaft 20 in the same rotational direction as the rotary input shaft 20 while trailing behind the rotation of the rotary input shaft 20 (i.e., while revolving at a slower speed than the rotation of the rotary input shaft 20 in association with the rotation of said rotary input shaft 20), and because each engageable roller 43 is made to wedge firmly between the torque transfer member 29 and the cylindrical rotary output shaft 25 by the differential rollers 35 to serve as a torque transfer member.

Moreover, since each engageable roller 43 that serves as a torque transfer member is formed in a cylindrical shape, the axis of which is parallel to the axis of the rotary input shaft 20, each engageable roller 43 is in contact with each of the torque transfer member 29 and the cylindrical rotary output shaft 25 on a contact area greater than that in the case where the torque transfer member is formed in a spherical member. Therefore, the efficiency of transferring torque from the rotary input shaft 20 to the cylindrical rotary output shaft 25 in the present embodiment of the one-way rotational transfer mechanism DM is higher than that in the case where each torque transfer member is formed in a spherical member.

Moreover, due to the utilization of the retainer 37, the annular space RS, which is formed between the torque transfer member 29 and the cylindrical rotary output shaft 25, can be used in a space-efficient manner. This makes it possible to increase the number of the engageable rollers 43. Increasing the number of the engageable rollers 43 makes it possible to improve the efficiency of transferring torque from the rotary input shaft 20 to the cylindrical rotary output shaft 25. Furthermore, the utilization of the retainer 37 makes it easy to assemble the ultrasonic rotary drive device and makes it possible to reduce the number of the engageable rollers 43.

The number of the differential rollers 35 or the engageable rollers 43 which are accommodated in each accommodation space CS can be changed by changing a cross sectional shape of the portion of the torque transfer member 29 on which the four circumferentially-uneven-width grooves 31 are formed to a regular polygonal shape other than a square shape such as a regular triangular shape or a regular pentagonal shape, or by forming this portion of the torque transfer member 29 to have a non-circular cross section so as to include at least one surface (circumferentially-uneven-width-space forming portion) which forms an accommodation space between an inner peripheral surface (cylindrical surface) of the cylindrical rotary output shaft 25 (the large-diameter cylindrical surface 27) and the aforementioned portion of the torque transfer member 29, so that the accommodation space has different radial widths at different circumferential positions. The efficiency of transferring torque from the rotary input shaft 20 to the cylindrical rotary output shaft 25 can be adjusted by changing in the number of the differential rollers 35 or the engageable rollers 43.

Each differential roller 35 can be replaced by a simple spherical member and also each engageable roller 43 can also be replaced by a simple spherical member if the efficiency of transferring torque from the rotary input shaft 20 to the cylindrical rotary output shaft 25 does not have to be taken into account.

Figure 5:
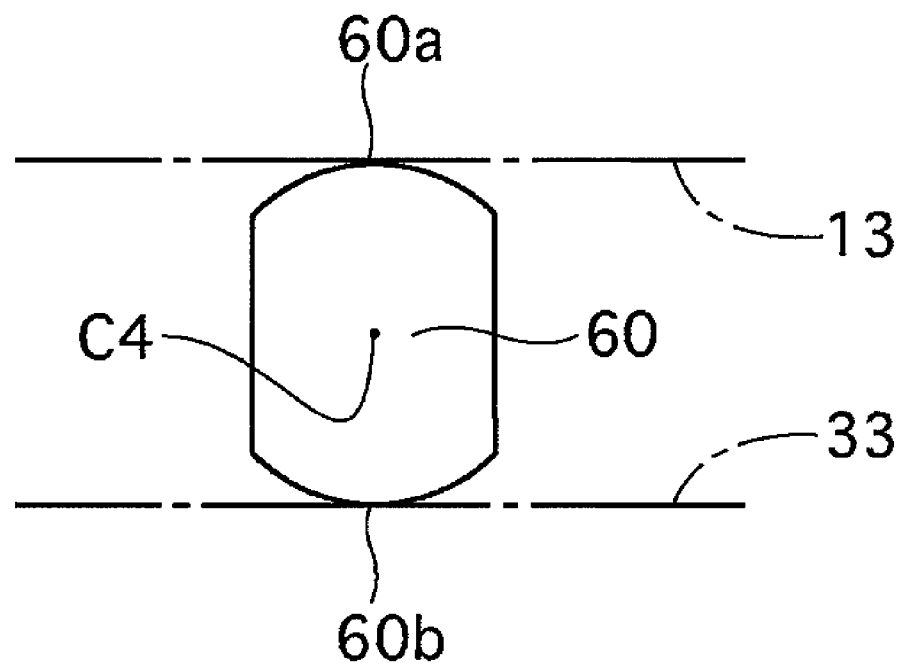
FIG. 5 is a cross sectional view of another embodiment of a differential roller, taken along a plane orthogonal to the axis thereof.

Each differential roller 35 can be replaced by a differential roller 60 such as shown in FIG. 5. The differential roller 60 is formed so that an axis C4 thereof extends in a radial direction of the rotary input shaft 20 or the cylindrical rotary output shaft 25, and so that the cross sectional shape of the differential roller 60 taken along a plane orthogonal to the axis C4 is the same as that shown in FIG. 5 at any axial position on the axis C4. In this case, the rotary input shaft 20 is rotated in a range so that a pair of arc portions 60a and 60b of the differential roller 60 remain engaged with the second axially orthogonal surface 33 and the first axially orthogonal surface 13, respectively, to make each engageable roller 43 wedge firmly between the torque transfer member 29 and the cylindrical rotary output shaft 25.

In addition, each differential roller 35 (60) and each engageable roller 43 can be installed only in a single accommodation space CS if the efficiency of transferring torque from the rotary input shaft 20 to the cylindrical rotary output shaft 25 does not have to be taken into account.

The efficiency of transferring torque transferred from the rotary input shaft 20 to the cylindrical rotary output shaft 25 can be changed by changing the wedge angle between the large-diameter cylindrical surface 27 of the cylindrical rotary output shaft 25 and one end of the circumferentially-uneven-width groove 31, or by changing the following factors: the spring force of the compression coil spring S1, the surface friction of the first axially orthogonal surface 13 and the surface friction of the second axially orthogonal surface 33.

In addition, although the ultrasonic rotary drive device is applied to an interchangeable lens designed for autofocus in the above illustrated embodiment of the ultrasonic rotary drive device, the ultrasonic rotary drive device can be installed between a zoom ring (hand-operated ring) which is provided on an interchangeable zoom lens and a zooming mechanism which is provided in the interchangeable lens to be linked with the zoom ring so that rotation of the ultrasonic motor UM (used as a zoom motor) is transferred to the zooming mechanism and so that rotation of the zoom ring is not transferred to the ultrasonic motor UM. This makes a power zoom operation (motor-driven zooming operation) and a manual zoom operation possible without the need for any switch for switching between power zoom mode and manual zoom mode.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An ultrasonic rotary drive device comprising:
   an ultrasonic motor including an ultrasonic generating portion and a first rotary output portion, wherein said first rotary output portion is in contact with said ultrasonic generating portion to be rotatable relative to said ultrasonic generating portion and rotates by ultrasonic vibrations generated by said ultrasonic generating portion; and
   a one-way rotational transfer mechanism including a rotary input portion and a second rotary output portion,
   wherein said rotary input portion rotates with said first rotary output portion, wherein said second rotary output portion is rotatable independently of said rotary input portion, wherein rotation of said rotary input portion is transferred to said second rotary output portion when said rotary input portion is rotated, and wherein rotation of said second rotary output portion is prevented from being transferred to said rotary input portion when said second rotary output portion is rotated.

2. The ultrasonic rotary drive device according to claim 1, wherein said one-way rotational transfer mechanism further comprises:

an axially orthogonal surface, provided on said rotary input portion, lying on a plane orthogonal to an axis of said first rotary output portion;

a hollow-cylindrical rotary output shaft, serving as said second rotary output portion, provided around said rotary input portion to be freely rotatable relative to said rotary input portion, said hollow-cylindrical rotary output shaft having a cylindrical inner peripheral surface centered on said axis of said first rotary output portion;

a circumferentially-uneven-width-space forming portion formed on said rotary input portion to form an annular space including at least one accommodation space between said rotary input portion and said cylindrical inner peripheral surface of said hollow-cylindrical rotary output shaft, said accommodation space having different radial widths at different circumferential positions;

at least one differential rotating member pressed against said axially orthogonal surface by a biasing device, said differential rotating member revolving around an axis of said rotary input portion in a same direction as a rotational direction of said rotary input portion while revolving at a slower speed than a speed of said rotation of said rotary input portion in association with said rotation of said rotary input portion;

a retainer installed in said annular space, wherein said retainer rotates around said axis of said rotary input portion in a same direction as the revolving direction of said differential rotating member when pressed by said differential rotating member; and at least one torque transfer member rotatably supported by said retainer so as to revolve together with the rotation of said retainer in said accommodation space, wherein said circumferentially-uneven-width-space forming portion is shaped so that said torque transfer member which revolves in a circumferential direction about said axis of said rotary input portion wedges between an outer peripheral surface of said rotary input portion and said cylindrical inner peripheral surface of said hollow-cylindrical rotary output shaft to transfer a torque from said rotary input portion to said hollow-cylindrical rotary output shaft when said rotary input portion is rotated.

3. The ultrasonic rotary drive device according to claim 2, further comprising a holding member which includes a second axially orthogonal surface lying on a plane orthogonal to said axis of said first rotary output portion and facing said axially orthogonal surface so that a biasing force of said biasing device biases said axially orthogonal surface so as to hold said differential rotating member between said axially orthogonal surface and said second axially orthogonal surface.

4. The ultrasonic rotary drive device according to claim 2, wherein said accommodation space comprises a plurality of accommodation spaces formed between said circumferentially-uneven-width-space forming portion and said cylindrical inner peripheral surface of said hollow-cylindrical rotary output shaft, and wherein said torque transfer member is installed in each of said plurality of accommodation spaces.

5. The ultrasonic rotary drive device according to claim 2, wherein said circumferentially-uneven-width-space forming portion comprises circumferentially-uneven-depth grooves having different radial depths at different circumferential positions.

6. The ultrasonic rotary drive device according to claim 1, wherein said ultrasonic generating portion and said first rotary output portion are coaxially-arranged ring members, respectively.

7. The ultrasonic rotary drive device according to claim 1, wherein said rotary input portion comprises a rotary input shaft and a cylindrical torque transfer member which is fitted on said rotary input shaft so as to allow said torque transfer member to move in a direction of an axis of said rotary input shaft relative to said rotary input shaft and prevent said torque transfer member from rotating relative to said rotary input shaft.

8. The ultrasonic rotary drive device according to claim 2, wherein said biasing device comprises a compression coil spring.

9. The ultrasonic rotary drive device according to claim 3, wherein said holding member is formed in a stationary cylindrical member having an annular inner flange, said second axially orthogonal surface being formed on said annular inner flange.

* * * * *

UNITED STATES PATENT AND TRADEMARK OFFICE
CERTIFICATE OF CORRECTION

PATENT NO. : 7,531,942 B2 Page 1 of 1
APPLICATION NO. : 11/857497
DATED : May 12, 2009
INVENTOR(S) : Hamasaki et al.

It is certified that error appears in the above-identified patent and that said Letters Patent is hereby corrected as shown below:

Title page, insert:  -- (30) Foreign Priority Data:
    JP 2006-254744..........................September 20, 2006 --.

Signed and Sealed this

Twenty-ninth Day of December, 2009

David J. Kappos
*Director of the United States Patent and Trademark Office*